United States Patent
Nasrullah et al.

(10) Patent No.: US 9,665,144 B2
(45) Date of Patent: May 30, 2017

(54) METHODS AND SYSTEMS FOR ENERGY EFFICIENCY AND ENERGY CONSERVATION INCLUDING ENTRY AND EXIT LATENCY REDUCTION FOR LOW POWER STATES

(75) Inventors: Jawad Nasrullah, Palo Alto, CA (US); Kelvin Kwan, Santa Clara, CA (US); Jaydeep P. Kulkarni, Hillsboro, OR (US); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 13/333,753

(22) Filed: Dec. 21, 2011

(65) Prior Publication Data
US 2012/0151235 A1    Jun. 14, 2012

(51) Int. Cl.
G06F 1/32 (2006.01)
G06F 1/26 (2006.01)

(52) U.S. Cl.
CPC .............. *G06F 1/26* (2013.01); *G06F 1/324* (2013.01); *G06F 1/3206* (2013.01); *G06F 1/3287* (2013.01); *G06F 1/3296* (2013.01); *Y02B 60/1217* (2013.01); *Y02B 60/1282* (2013.01); *Y02B 60/1285* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 6,092,207 A * | 7/2000 | Kolinski et al. | 713/323 |
| 2005/0219903 A1 | 10/2005 | Daga | |
| 2007/0217271 A1 * | 9/2007 | Kutz et al. | 365/189.09 |
| 2009/0046532 A1 * | 2/2009 | Gouin | 365/228 |
| 2010/0195412 A1 * | 8/2010 | Furutani et al. | 365/189.05 |
| 2010/0329062 A1 | 12/2010 | Campbell et al. | |
| 2011/0016338 A1 * | 1/2011 | Williamson | G06F 9/30087 713/323 |
| 2011/0058439 A1 * | 3/2011 | Lee et al. | 365/227 |
| 2011/0231681 A1 | 9/2011 | Allarey et al. | |

OTHER PUBLICATIONS

International Preliminary Report on Patentability for International Application No. PCT/US2012/066652 mailed Jun. 24, 2014, 8 pages.
International Search Report and Written Opinion for International Application No. PCT/US2012/066652 mailed Feb. 28, 2013, 11 pages.
Office Action for corresponding Chinese Patent Application No. 201280059272.8 mailed Nov. 4, 2015, 23 pages.

* cited by examiner

Primary Examiner — Thomas Lee
Assistant Examiner — Vincent Chang
(74) Attorney, Agent, or Firm — NDWE LLP

(57) ABSTRACT

Systems and methods for entry and exit latency reduction for low power states are described. In one embodiment, a computer implemented method initiates an energy-efficient low power state (e.g., deep sleep state) to reduce power consumption of a device. The method sets a power supply voltage that provides sufficient power to a dual power supply array for retention of states. Logic is powered down in this low power state.

16 Claims, 10 Drawing Sheets

METHODS AND SYSTEMS FOR ENERGY EFFICIENCY AND ENERGY CONSERVATION INCLUDING ENTRY AND EXIT LATENCY REDUCTION FOR LOW POWER STATES

TECHNICAL FIELD

This disclosure relates to methods and systems for energy efficiency and energy conservation including entry and exit latency reduction for low power states to reduce power consumption.

BACKGROUND

Power management techniques for computer systems and processors typically use sleep states. For example, to save energy when the processors are idle, the processors can be commanded into a low power state or sleep state. These states typically cut the clock signal and power from idle units inside the processors. The more units that are stopped by cutting the clock, reducing the voltage, or completely shutting down, then the more energy that can be saved. However, the more circuits and signals that are turned off, then the more time the processors will need to wake-up. The power states are called the C-states (e.g., C0-C6) with C0 being the operating state with the processors fully turned on and C6 being the deep sleep state that reduces the internal voltage of one or more processors to any value including 0 volts. C6 suffers from long latencies (several tens of microseconds) and C6 can not be efficiently used for dead times less than a few hundred microseconds.

Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
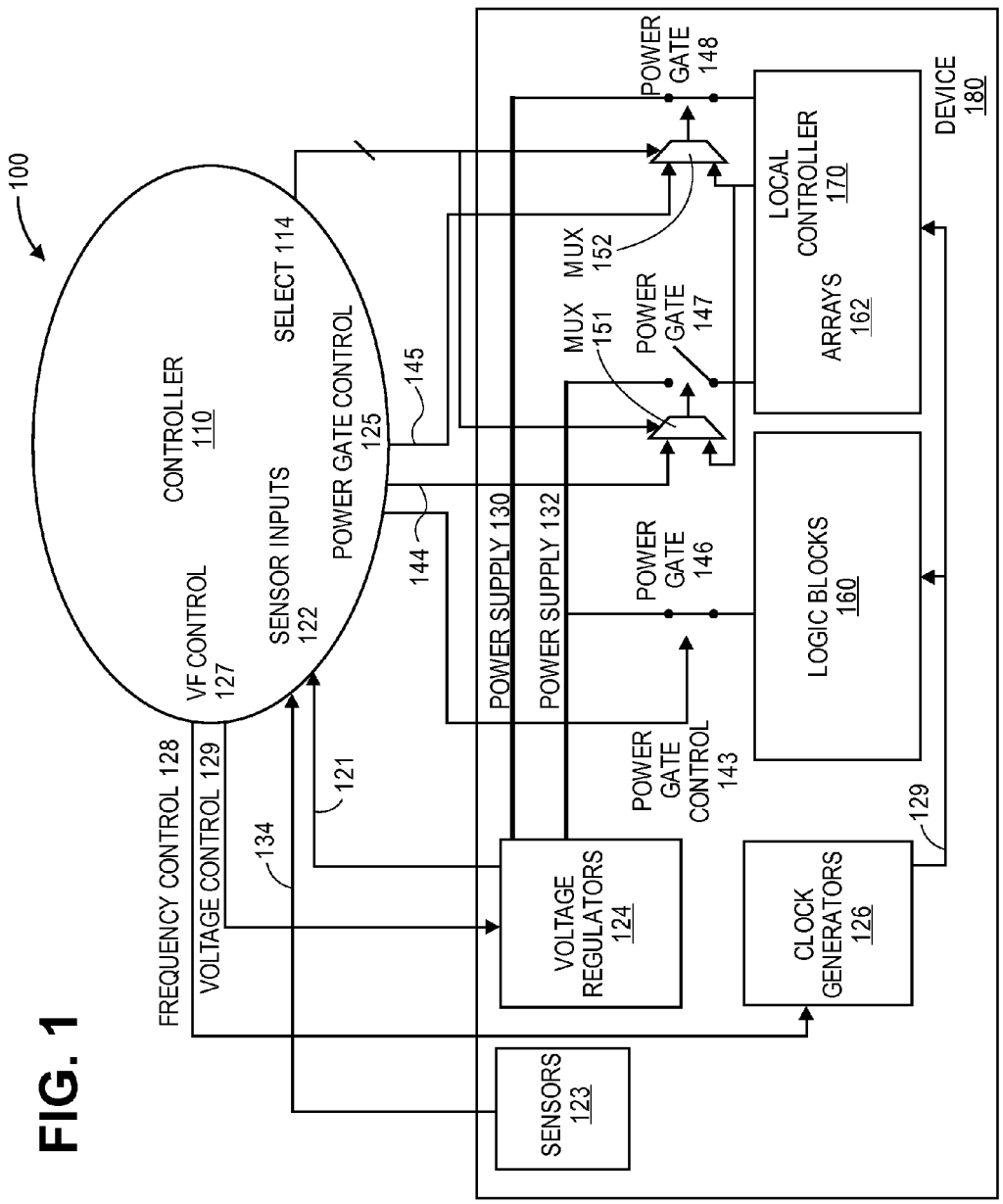
FIG. 1 illustrates a block diagram of a system 100 having power control for reducing entry and exit latency for low power states to reduce power consumption in accordance with one embodiment of the present invention.

Systems and methods for entry and exit latency reduction for low power states to reduce power consumption are described. Embodiments of this invention provide quick energy-efficient entries into and energy-efficient exits from deep sleep power states, such as C6, by using a dual power supply based array design. Typically, a considerable part of the latency is consumed by micro-architectural save and restore operations. Long exit and entry latencies causes the power management system to use deep sleep states infrequently. Thus, at the system level, the overall power reduction potential of deep sleep power states remains severely under-utilized. The state save and restore component of the entry and exit latencies is eliminated by repurposing the secondary power supply for state retention. In prior approaches, this secondary power supply is only used for improving a minimum power supply level. Arrays that typically hold local memory content on chip limit the minimum voltage operation. Repurposing of the dual power supply array helps with the deep sleep state latency by keeping the state of the architecture. The present design interfaces with a software power control algorithm to control the differential between power supplied to the logic and arrays.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a micro-controller, or the like. The interconnect between chips each could be point-to-point or each could be in a multi-drop arrangement, or some could be point-to-point while others are a multi-drop arrangement.

FIG. 1 illustrates a block diagram of a system 100 having power control for reducing entry and exit latency for low power states to reduce power consumption in accordance with one embodiment of the present invention. The system 100 includes a controller 110 (e.g., CPU core, power control unit, microcontroller, hybrid device) having power control software that can be stored on or associated with the controller. For a CPU core, the power control software may be firmware. Alternatively, a microcontroller or power control unit may store the power control software 110. The controller 110 receives one or more inputs 122 (e.g., power, temperature, aging speed, etc.) via signal 134 from sensors 123 and via signal 121 from voltage regulators 124. The input(s) from the voltage regulators are based on voltages of the power supply 130 and power supply 132. The power gate control 125 generates power gate control signals 143-145 to control a position of the power gates 146-148, respectively, as being open or closed. The VF control 127 generates outputs, frequency control 128 and voltage control 129, to control the frequency of the clock generators 126 and voltage of the voltage regulators 124, respectively. The clock signals 129 are provided to various blocks including logic blocks 160 and arrays 162 (e.g., register files, SRAM) of the device 180 that is under power control. The voltage regulators 124 may also be located off-chip rather than on the device. The select 114 allows global (controller 110) or local control (local controller 170) of the arrays 162.

The logic portion (e.g., logic blocks 160) are powered with a gated supply and the power gates are turned on or off by the main controller 110. The gates 147 and 148 can be controlled with the main controller or the local controller. However, the arrays 162 including the arrays, which may hold architectural states, are powered with dual power supplies 130 and 132 (e.g., dual-Vcc). The control of the dual power supply rails either resides with the main controller 110 or with the local controller 170 though the main controller 110 may be the only controller to control the values of the dual power supplies. In energy-efficient deep sleep (e.g., C6), the main controller 110 uses the software to control the power supply 130 to keep the array powered at a retention voltage for retaining architectural state information. The power supply 132 is set to zero and the logic blocks 160 are powered down. In active state, the software allows the arrays 162 to locally control and select the power supply. The arrays 162 optimize a minimum power supply voltage level (e.g., Vccmin), power dissipation, or array area efficiency. In this case, the power supply 130 has a higher voltage than a voltage of the power supply 132. The logic blocks 160 again receive the power supply 132 while the arrays 162 receive power supplies from both the power supplies 130 and 132 with the local controller 170 controlling the power supply to the arrays 162. The local controller 170 is coupled to the multiplexers 151 and 152 in order to control the power gates 147 and 148.

In one embodiment, the system includes the controller 110 and the device 180 that is coupled to the controller as illustrated in FIG. 1. The device includes one or more logic blocks 160, one or more arrays 162 (e.g., dual power supply array). The power supply 132 is adaptively coupled to the one or more logic blocks and to the one or more arrays. The power supply 130 is adaptively coupled to the one or more arrays. The controller 110 is configured by executing the software power control instructions to initiate an energy-efficient low power state for the device to reduce power consumption, to power down the one or more logic blocks, to couple the power supply 130 to the one or more arrays, and to set a voltage of the power supply 130 to a sufficient retention voltage to retain architectural states in the one or more arrays. The arrays 162 include a local controller. The voltage regulators 124 receive voltage control inputs from the controller and provide the power supplies 130 and 132. The power gate 146 adaptively couples the power supply 132 to the logic blocks 160. The power gate 147 adaptively couples the power supply 132 to arrays 162 and the power gate 148 adaptively couples the power supply 130 to the arrays 162.

In an embodiment, the controller is configured to initiate an active power state for the device and to power up the logic blocks 160 with power supply 132. The local controller 170 is configured to couple the power supplies 130 and 132 to the arrays 162 while the controller sets voltages for the power supplies. The controller interfaces with a power control algorithm to control voltages supplied to the logic blocks and the arrays. The present design repurposes the dual power supply array 162 to help with the low power state (e.g., deep sleep state) latency by keeping the architectural states. The present design significantly reduces leakage power (e.g., down to approximately 20% for C6 of what is possible compared to higher sleep states). The present design achieves a lower minimum voltage level (Vcc min) and/or better array efficiency compared to previous approaches. One previous approach uses hardware acceleration to speed up the state save and restore operations. However, the hardware complexity increases prohibitively with marginal benefits. For example, adding separate channels and state machine for save and restore operations can be used to speed up these operations.

Figure 2:
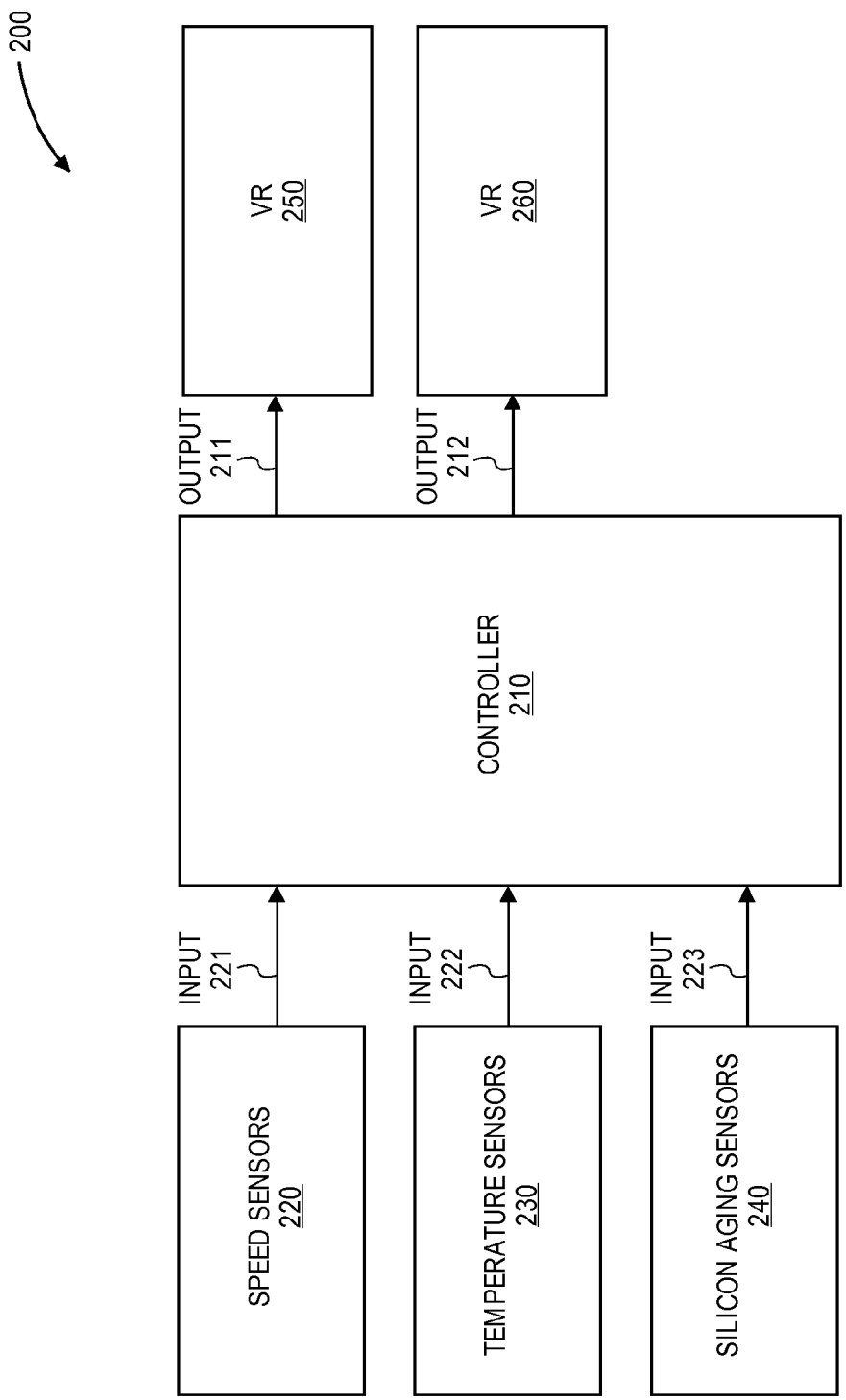
FIG. 2 illustrates a block diagram of a controller architecture 200 for a dual power supply design in accordance with one embodiment of the present invention.

FIG. 2 illustrates a block diagram of a controller architecture 200 for a dual power supply design in accordance with one embodiment of the present invention. The controller 210 receives inputs 221-223 from speed sensors 220, temperature sensors 230, and silicon aging sensors 240. The controller 210 sends output signals 211 to the voltage regulator 250, which provides power to the logic, and output signals 212 to the voltage regulator 260, which provides power to the arrays.

The voltage regulators 250 and 260 are available side-by-side to provide dual-Vcc. Such a situation may arise in systems with several available voltage regulators. In such cases, the controller takes the input from all the sensors and directly controls both of the voltage regulators. The controller 210 may implement a power supply (e.g., Vcc logic) algorithm to compute a power supply voltage for the logic. The controller 210 may implement a power supply (e.g., Vcc array) algorithm to compute a power supply voltage for the array.

Figure 3:
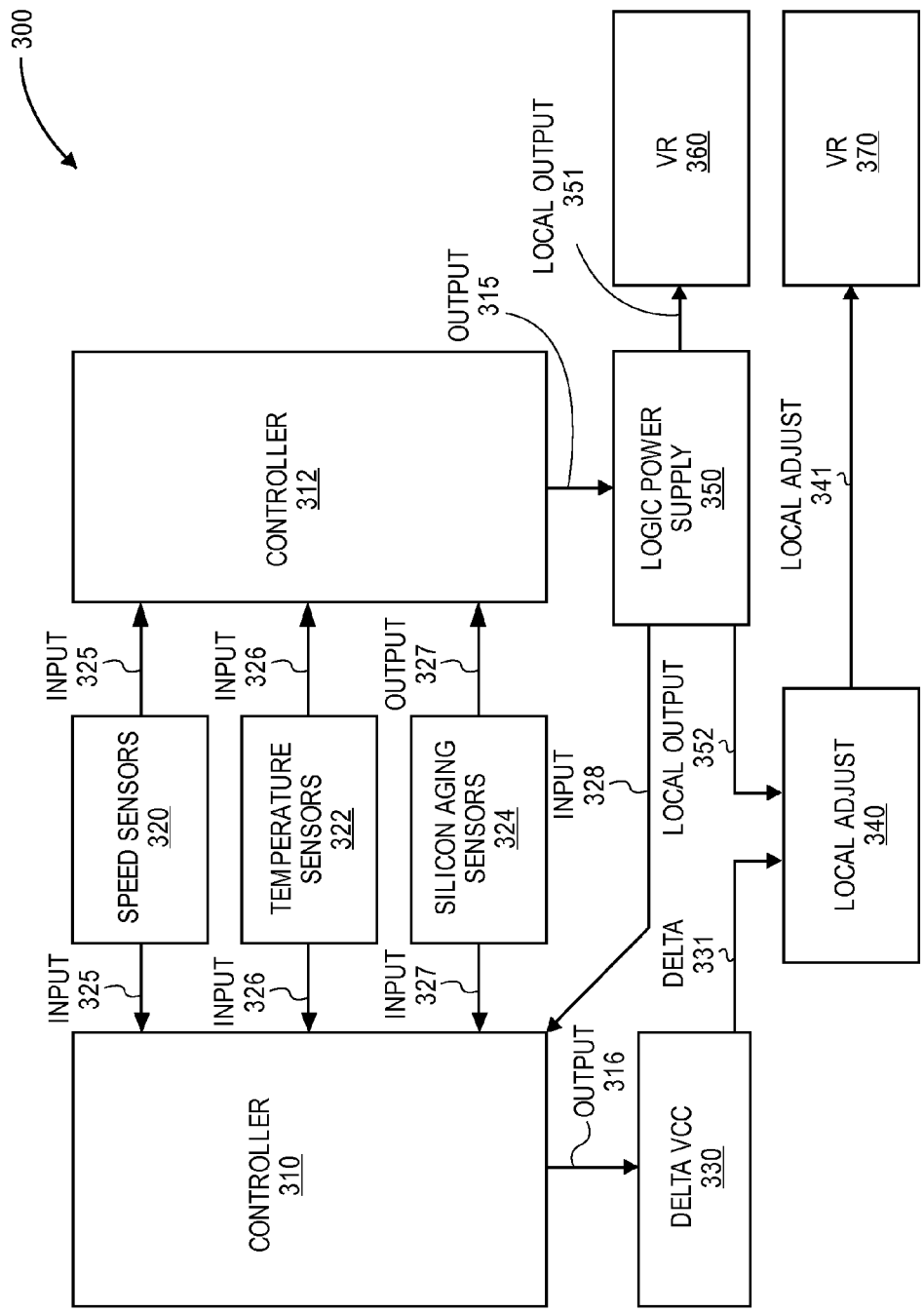
FIG. 3 illustrates a block diagram of a controller architecture 300 for a dual power supply design in accordance with another embodiment of the present invention.

FIG. 3 illustrates a block diagram of a controller architecture 300 for a dual power supply design in accordance with another embodiment of the present invention. The controllers 310 and 312 each receive inputs 325-327 from speed sensors 320, temperature sensors 322, and silicon aging sensors 324. The controller architecture 300 shows a design for when one global voltage regulator 360 is available and the secondary supply voltage is generated with a local voltage regulator 370. In such a case, the global regulator 360 generates a supply voltage for logic. The controller 312 may implement a logic power supply (e.g., Vcc logic) algorithm to compute a power supply voltage via output 315 for the logic power supply 350 based on the sensor data. The logic power supply 350 generates logic output signal 351 for adjusting the voltage regulator 360.

The controller 310 implements a delta power supply (e.g., delta Vcc) algorithm to compute a delta power supply based on sensor data and supply voltage for the logic. In one embodiment, the delta power supply is computed based on a difference between the supply voltage of the array and the supply voltage of the logic. The delta power supply (i.e., difference of the secondary voltage) is computed and used to control the voltage for the arrays via output signal 316, delta signal 331, logic output 352, and local adjust signal 341. The local adjust 340 makes any necessary local adjustments to the local regulator 370 based on outputs 331 and 352 from the delta power supply 330 and the logic power supply 350. The local regulator 370 provides the voltage supply to the arrays.

Figure 4:
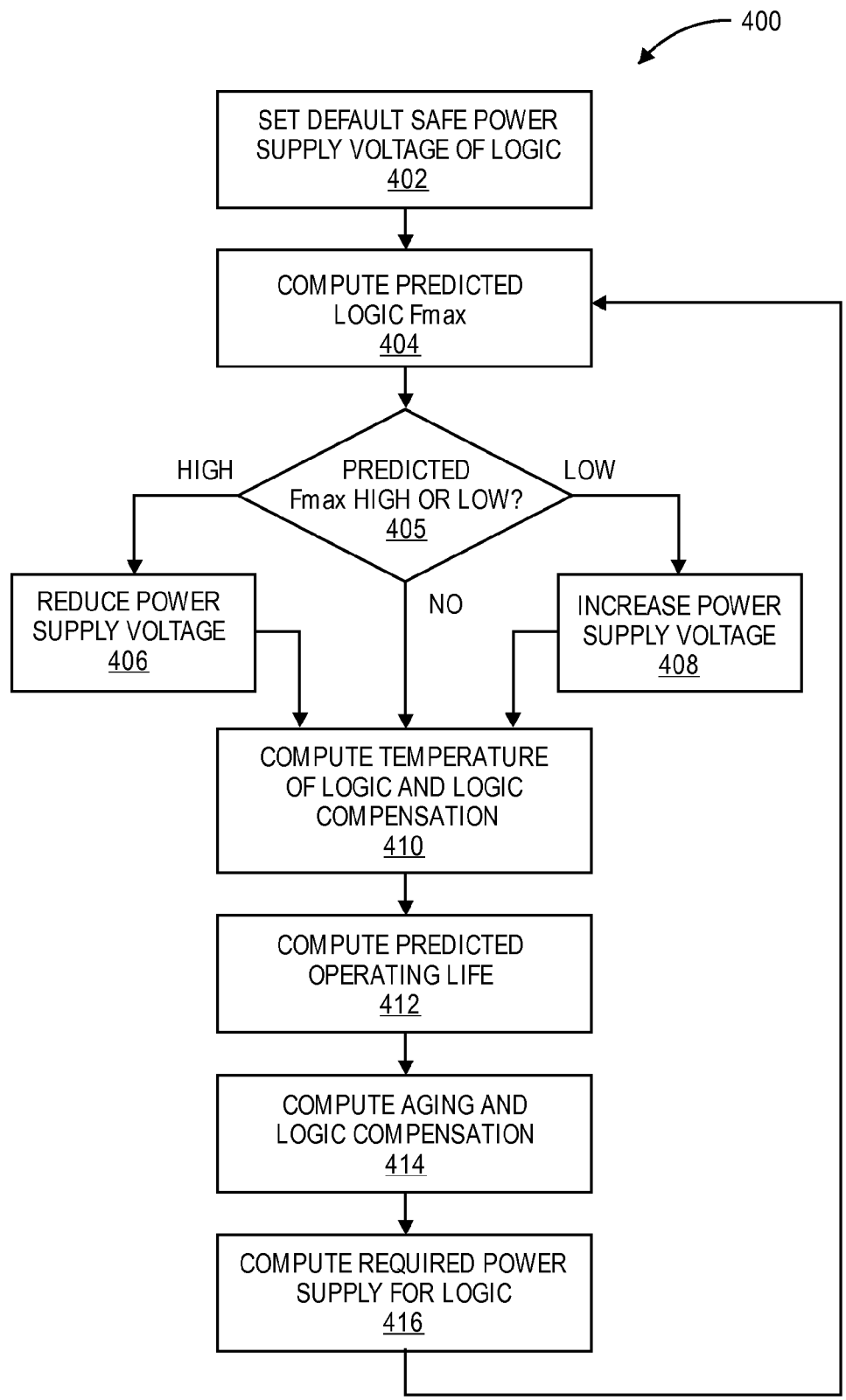
FIG. 4 illustrates a flow diagram of one embodiment for a computer-implemented method 400 for controlling a power supply for logic with a controller of a device in accordance with one embodiment of the present invention.

FIG. 4 illustrates a flow diagram of one embodiment for a computer-implemented method 400 for controlling a power supply for logic with a controller of a device in accordance with one embodiment of the present invention. The method 400 is performed by processing logic that may comprise hardware (circuitry, dedicated logic, etc.), software (such as is run on a general purpose computer system or a dedicated machine or a device), or a combination of both. In one embodiment, the method 400 is performed by processing logic associated with the devices or systems discussed herein such as the main controller to implement a power supply (e.g., Vcc logic) algorithm for logic as described in conjunction with FIGS. 2 and 3.

At block 402, the processing logic initiates the power supply algorithm for an active fully operating state of the logic and sets a default safe voltage level for the power supply of logic. The processing logic computes a predicted maximum frequency (Fmax) for logic of the device based on one or more inputs (e.g., logic speed sensors) at block 404. A low power state may limit the predicted frequency to a different (lower) frequency than a normal power state. At block 405, the processing logic determines whether the predicted Fmax is too high or too low. If the predicted Fmax is high, then the processing logic reduces the power supply for the logic at block 406. If the processing logic determines that the Fmax is too low, then the processing logic increases the power supply at block 408, for example, to maintain a safe guardband voltage. If the predicted Fmax is not too high or too low, then the flow proceeds to block 410.

At block 410, the processing logic computes a temperature of the logic based on temperature sensors of the logic and then compensates the power supply voltage for the logic if necessary. At block 412, the processing logic computes a predicted operating life of the logic based on input from logic aging sensors. At block 414, the processing logic computes aging of the logic and compensates the power supply voltage if necessary. At block 416, the processing logic computes a required power supply voltage based on the computations of method 400. This voltage is used for subsequent iterations of the method 400. After block 416, the device returns to block 404.

Figure 5:
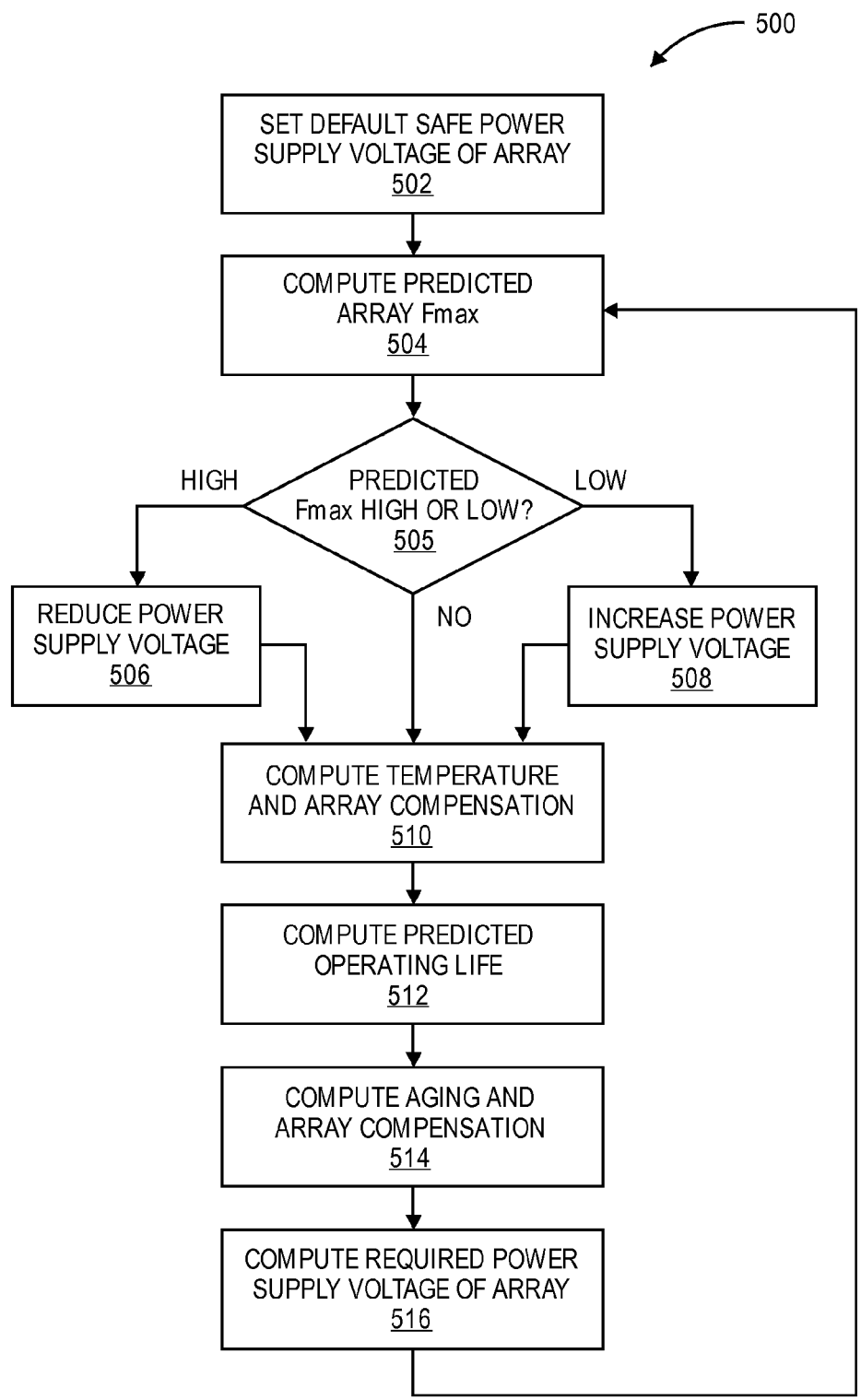
FIG. 5 illustrates a flow diagram of one embodiment for a computer-implemented method 500 for controlling a power supply for an array during an active state with a controller of a device in accordance with one embodiment of the present invention.

FIG. 5 illustrates a flow diagram of one embodiment for a computer-implemented method 500 for controlling a power supply for an array during an active state with a controller of a device in accordance with one embodiment of the present invention. The method 500 is performed by processing logic that may comprise hardware (circuitry, dedicated logic, etc.), software (such as is run on a general purpose computer system or a dedicated machine or a device), or a combination of both. In one embodiment, the method 500 is performed by processing logic associated with the devices or systems discussed herein such as the main controller to implement a power supply (e.g., Vcc array) algorithm as described in conjunction with FIGS. 2 and 3.

At block 502, the processing logic initiates the power supply algorithm for an active fully operating state of the array and sets a default safe voltage level for the power supply of the array. The processing logic computes a predicted maximum frequency (Fmax) for the array(s) of the device based on one or more inputs (e.g., array speed sensors) at block 504. A low power state may limit the predicted frequency to a different (lower) frequency than a normal power state. At block 505, the processing logic determines whether the predicted Fmax is too high or too low. If the predicted Fmax is high, then the processing logic reduces the power supply for the array at block 506. If the processing logic determines that the Fmax is too low, then the processing logic increases the power supply at block 508, for example, to maintain a safe guardband voltage. If the predicted Fmax is not too high or too low, then the flow proceeds to block 510.

At block 510, the processing logic computes a temperature of the array based on temperature sensors of the array and then compensates the power supply voltage if necessary. At block 512, the processing logic computes a predicted operating life of the array based on input from aging sensors of the array. At block 514, the processing logic computes aging of the array and compensates the power supply voltage if necessary. At block 516, the processing logic computes a required power supply voltage for the array based on the computations of method 500. This voltage is used for subsequent iterations of the method 500. After block 516, the device returns to block 504.

Figure 6:
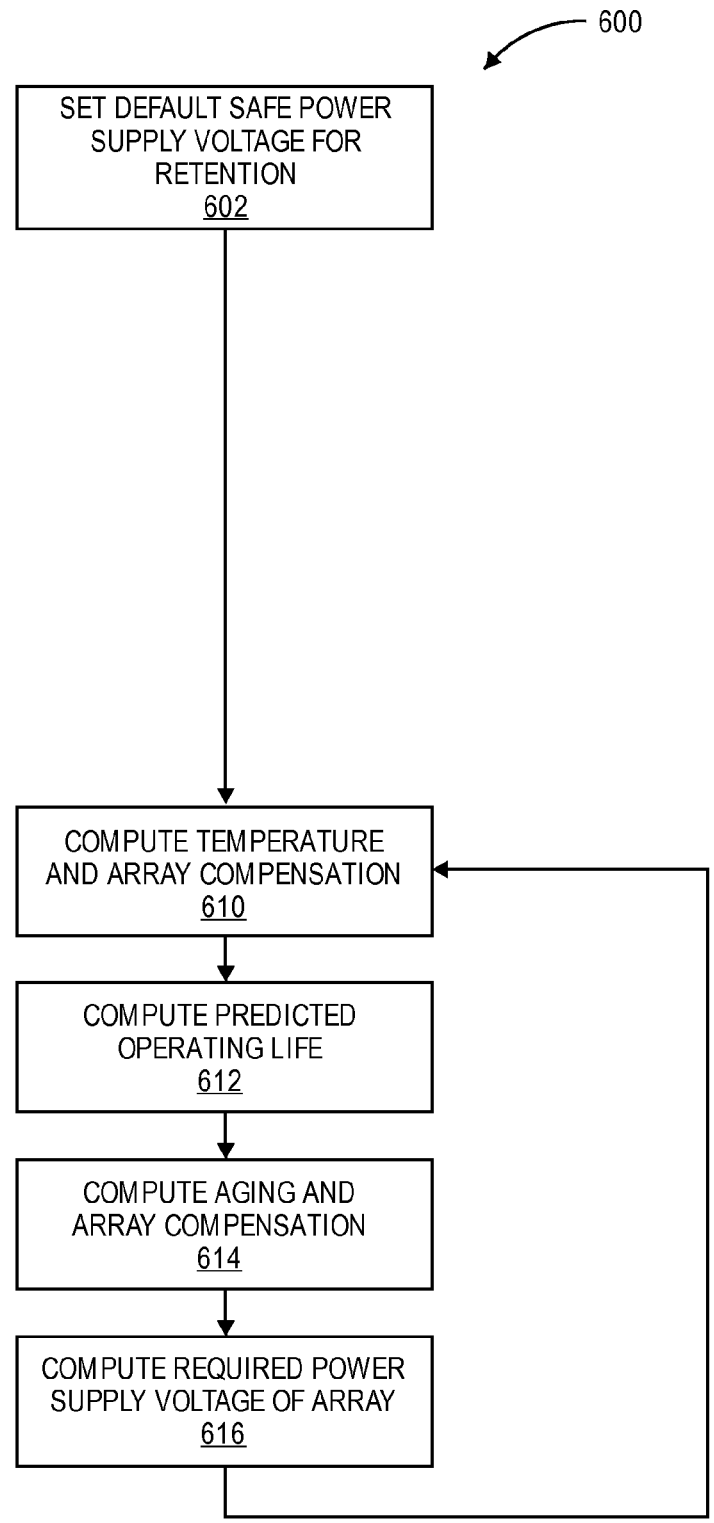
FIG. 6 illustrates a flow diagram of one embodiment for a computer-implemented method 600 for controlling a power supply for an array during a low power state (e.g., deep sleep state) with a controller of a device in accordance with one embodiment of the present invention.

FIG. 6 illustrates a flow diagram of one embodiment for a computer-implemented method 600 for controlling a power supply for an array during a low power state (e.g., deep sleep state) with a controller in accordance with one embodiment of the present invention. The method 600 is performed by processing logic that may comprise hardware (circuitry, dedicated logic, etc.), software (such as is run on a general purpose computer system or a dedicated machine or a device), or a combination of both. In one embodiment, the method 600 is performed by processing logic associated with the devices or systems discussed herein such as the main controller to implement a power supply (e.g., Vcc array) algorithm as described in conjunction with FIGS. 2 and 3.

At block 602, the processing logic initiates the power supply algorithm for a low power state of the array (e.g., dual power supply array) to reduce power consumption and sets a default safe voltage level for retention of architectural states using the array. The architectural states may be associated with an architecture of a processing core that is powered down during the low power state.

At block 610, the processing logic computes a temperature of the array based on temperature sensors of the array and then compensates the power supply voltage if necessary. At block 612, the processing logic computes a predicted operating life of the array based on input from aging sensors of the array. At block 614, the processing logic computes aging of the array and compensates the power supply voltage if necessary. At block 616, the processing logic computes a required power supply voltage for the array based on the computations of method 600. This voltage is used for subsequent iterations of the method 600. After block 616, the device returns to block 610.

Figure 7:
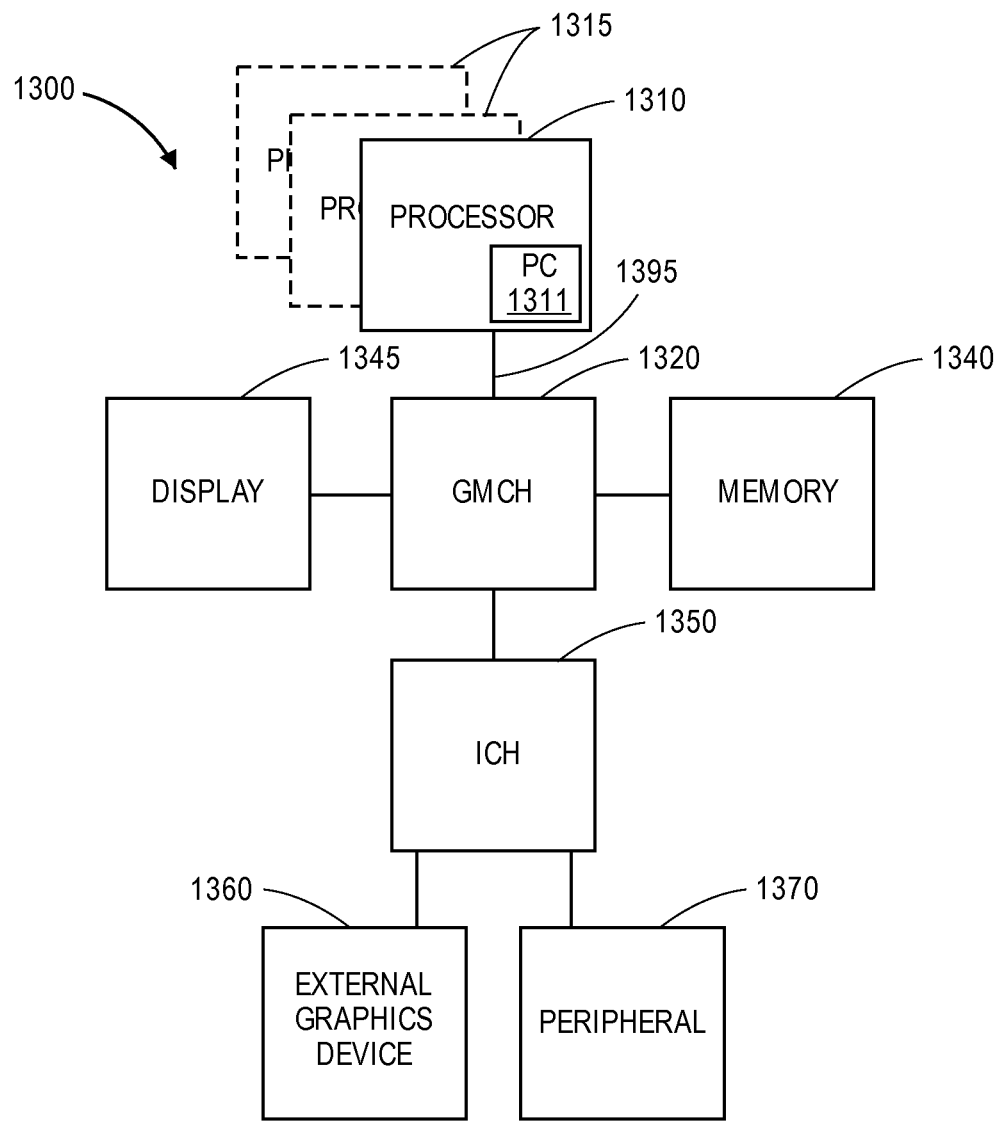
FIG. 7 is a block diagram of a system 1300 in accordance with one embodiment of the invention.

FIG. 7 illustrates a block diagram of a system 1300 in accordance with one embodiment of the present invention. The system 1300 may include one or more processors 1310, 1315, which are coupled to graphics memory controller hub (GMCH) 1320. The optional nature of additional processors 1315 is denoted in FIG. 8 with broken lines. FIG. 7 illustrates that the GMCH 1320 may be coupled to the memory 1340 that may be, for example, a dynamic random access memory (DRAM). The DRAM may, for at least one embodiment, be associated with a non-volatile cache. One or more of the processors may include a power control block 1311 (e.g., system 100, controller architecture 200, controller architecture 300) having power control software for implementing embodiments of the invention.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 8 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 8:
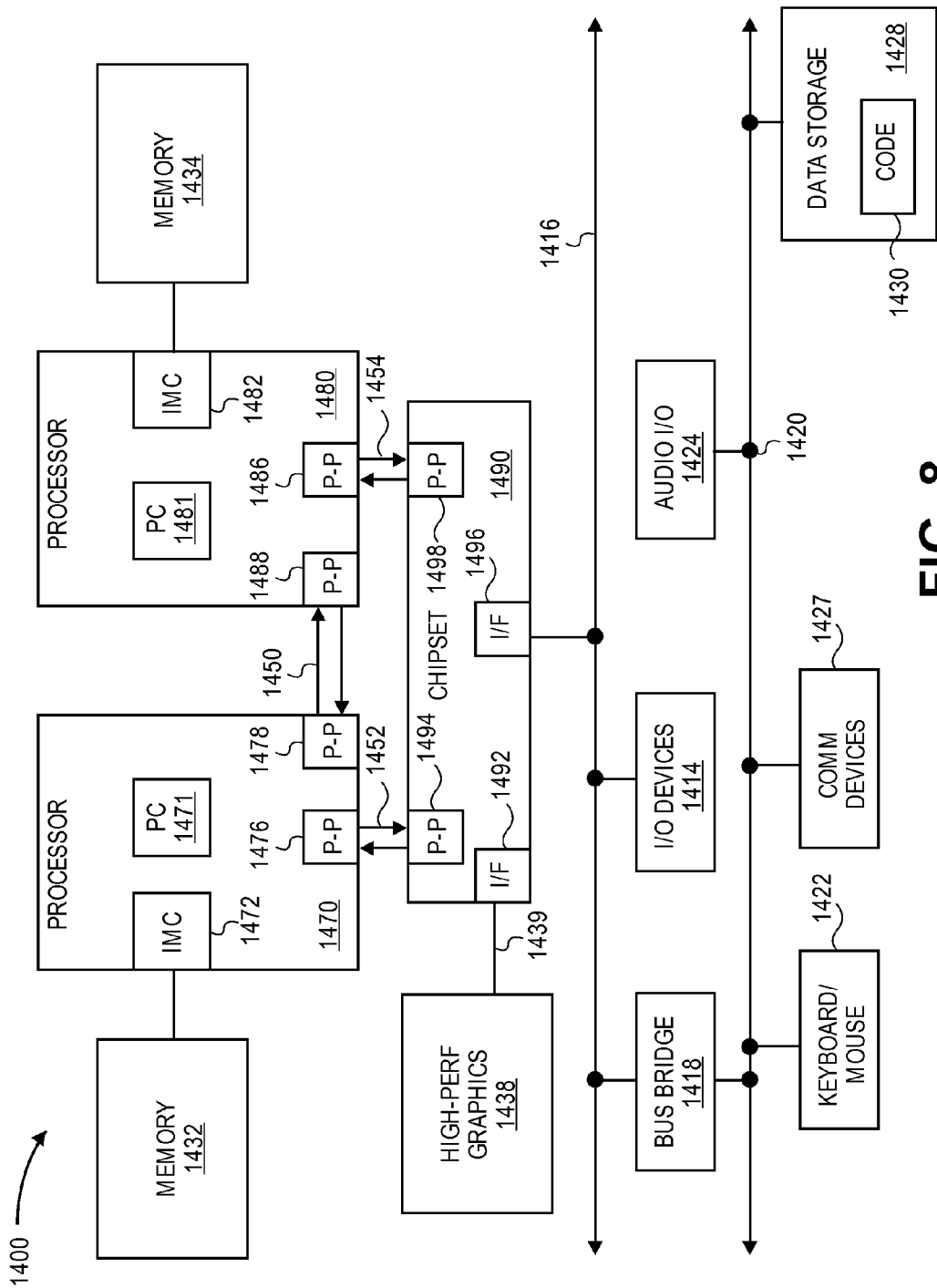
FIG. 8 is a block diagram of a second system 1400 in accordance with an embodiment of the invention.

Referring now to FIG. 8, shown is a block diagram of a second system 1400 in accordance with an embodiment of the present invention. As shown in FIG. 8, multiprocessor system 1400 is a point-to-point interconnect system, and includes a first processor 1470 and a second processor 1480 coupled via a point-to-point interconnect 1450. Alternatively, one or more of processors 1470, 1480 may be an element other than a processor, such as an accelerator or a field programmable gate array. While shown with only two processors 1470, 1480, it is to be understood that the scope of embodiments of the present invention is not so limited. In other embodiments, one or more additional processing elements may be present in a given processor. One or more of the processors may include power control blocks 1471 or 1481 (e.g., system 100, controller architecture 200, controller architecture 300) having power control software to implement embodiments of the invention.

Figure 9:
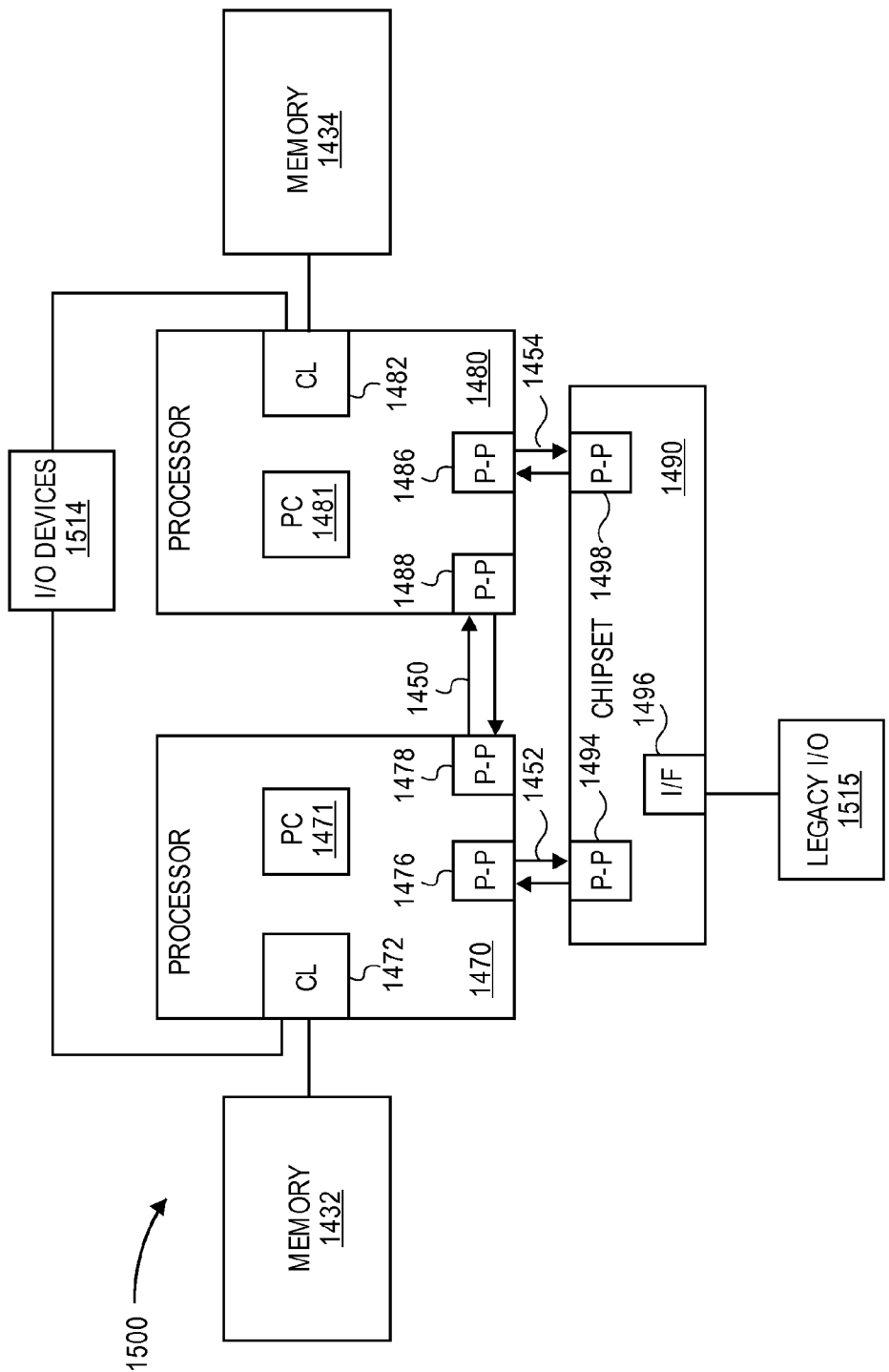
FIG. 9 is a block diagram of a third system 1500 in accordance with an embodiment of the invention.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 9, IMC's 1472 and 1482 couple the processors to respective memories, namely a memory 1442 and a memory 1444, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1439.

A shared cache (not shown) may be included in either processor outside of both processors, yet connected with the processors via P-P interconnect, such that either or both processors' local cache information may be stored in the shared cache if a processor is placed into a low power state.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of embodiments of the present invention is not so limited.

As shown in FIG. 8, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 8, a system may implement a multi-drop bus or other such architecture.

Referring now to FIG. 9, shown is a block diagram of a third system 1500 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIG. 8. In addition, CL 1472, 1482 may also include I/O control logic. FIG. 9 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490. One or more of the processing elements may include a power control blocks 1471 or 1481 (e.g., system 100, controller architecture 200, controller architecture 300) having power control software to implement embodiments of the invention.

Figure 10:
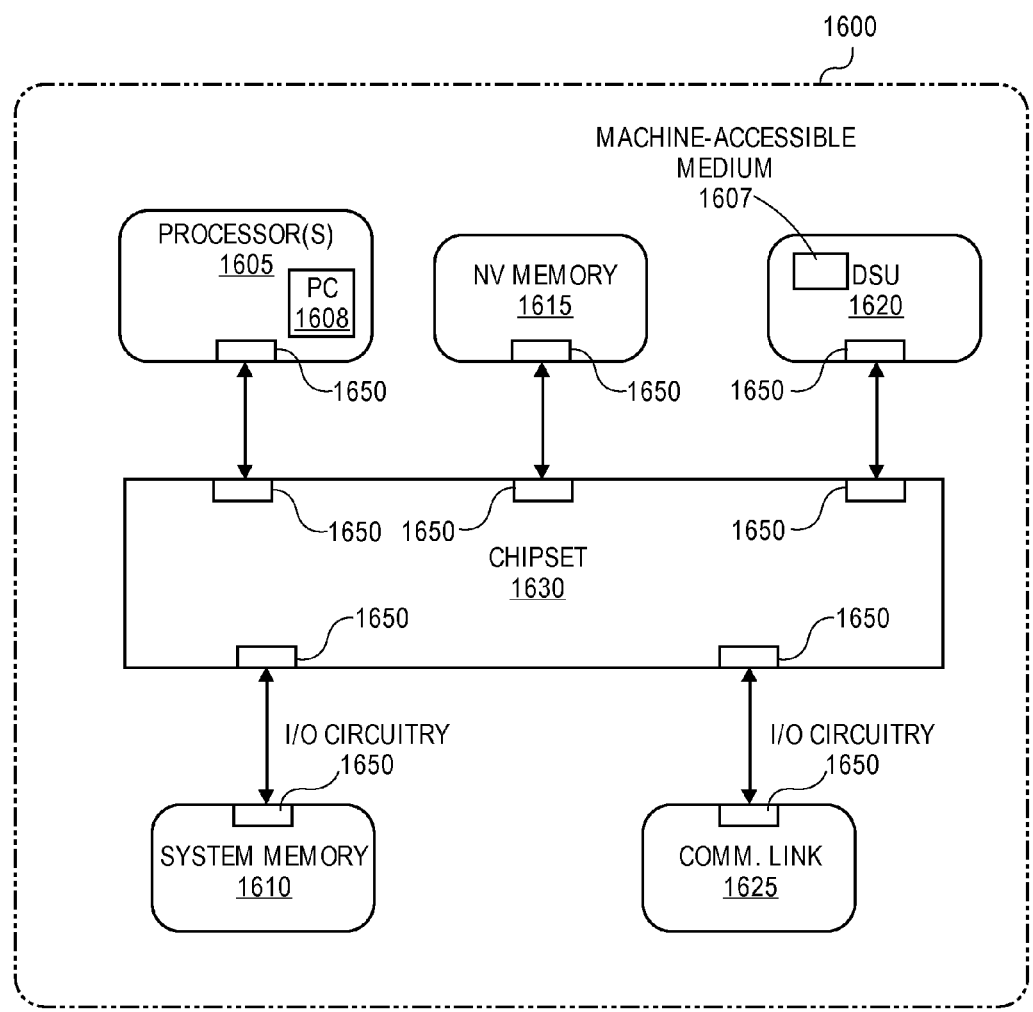
FIG. 10 illustrates a functional block diagram illustrating a system 1600 implemented in accordance with one embodiment of the invention.

FIG. 10 illustrates a functional block diagram illustrating a system 1600 implemented in accordance with one embodiment. The illustrated embodiment of processing system 1600 includes one or more processors (or central processing units) 1605 having power control block 1608 (e.g., system 100, controller architecture 200, controller architecture 300) with power control software, system memory 1610, non-volatile ("NV") memory 1615, a data storage unit ("DSU") 1620, a communication link 1625, and a chipset 1630. The illustrated processing system 1600 may represent any computing system including a desktop computer, a notebook computer, a workstation, a handheld computer, a server, a blade server, or the like.

The elements of processing system 1600 are interconnected as follows. Processor(s) 1605 is communicatively coupled to system memory 1610, NV memory 1615, DSU 1620, and communication link 1625, via chipset 1630 to send and to receive instructions or data thereto/therefrom. In one embodiment, NV memory 1615 is a flash memory device. In other embodiments, NV memory 1615 includes any one of read only memory ("ROM"), programmable ROM, erasable programmable ROM, electrically erasable programmable ROM, or the like. In one embodiment, system memory 1610 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 320 represents any storage device for software data, applications, and/or operating systems, but will most typically be a nonvolatile storage device. DSU 320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1620 is illustrated as internal to processing system 1600, DSU 320 may be externally coupled to processing system 1600. Communication link 1625 may couple processing system 1600 to a network such that processing system 1600 may communicate over the network with one or more other computers. Communication link 1625 may include a statem, an Ethernet card, a Gigabit Ethernet card, Universal Serial Bus ("USB") port, a wireless network interface card, a fiber optic interface, or the like.

The DSU 1620 may include a machine-accessible medium 1607 on which is stored one or more sets of instructions (e.g., software) embodying any one or more of the methods or functions described herein. The software may also reside, completely or at least partially, within the processor(s) 1605 during execution thereof by the processor(s) 1605, the processor(s) 1605 also constituting machine-accessible storage media.

While the machine-accessible medium 1607 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of embodiments of the present invention. The term "machine-accessible medium" shall accordingly be taken to include, but not be limited to, solid-state memories, optical, and magnetic media.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

As illustrated in FIG. 10, each of the subcomponents of processing system 1600 includes input/output ("I/O") circuitry 1650 for communication with each other. I/O circuitry 1650 may include impedance matching circuitry that may be adjusted to achieve a desired input impedance thereby reducing signal reflections and interference between the subcomponents.

It should be appreciated that various other elements of processing system 1600 have been excluded from FIG. 11 and this discussion for the purposes of clarity. For example, processing system 1600 may further include a graphics card, additional DSUs, other persistent data storage devices, and the like. Chipset 1630 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1630. Correspondingly, processing system 1600 may operate without one or more of the elements illustrated. For example, processing system 1600 need not include DSU 1620.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A system, comprising:
 a memory;
 a controller; and
 a device coupled to the controller, wherein the device includes
   one or more logic blocks; and
   one or more arrays of registers to store architectural state;
 a first power supply to be adaptively coupled to the one or more logic blocks and to the one or more arrays of registers; and
 a second power supply to be adaptively coupled to the one or more arrays of registers, wherein the controller is to initiate an energy-efficient low power state for the device to reduce power consumption by powering down the one or more logic blocks, and to couple the second power supply to the one or more arrays of registers and set a voltage of the second power supply to a retention voltage to retain states in the one or more arrays of registers during the energy-efficient low power state;
 wherein the retention voltage provided by the second power supply is different than a voltage provided by the first power supply during a non-low power state;
 wherein the controller is to reduce a latency associated with entering and exiting from the energy-efficient low-power state by accessing at least part of the architectural state from the one or more arrays of registers instead of from the memory;
 wherein the one or more arrays of registers comprise a dual power supply array having a local controller; and
 wherein the local controller is to couple the first and second power supplies to the one or more arrays of registers while the controller sets voltages for the first and second power supplies.

2. The system of claim 1, further comprising:
 a first voltage regulator to receive a first voltage control input from the controller and to provide the first power supply; and
 a second voltage regulator to receive a second voltage control input from the controller and to provide the second power supply.

3. The system of claim 1, further comprising:
 a first power gate to adaptively couple the first power supply to the one or more logic blocks;
 a second power gate to adaptively couple the first power supply to the dual power supply array; and
 a third power gate to adaptively couple the second power supply to the dual power supply array.

4. The system of claim 1, wherein the controller is to initiate an active power state for the device, to power up the one or more logic blocks.

5. The system of claim 1, wherein the controller interfaces with a power control algorithm to control voltages supplied to the one or more logic blocks and the dual power supply array.

6. A device, comprising:
 a memory;
 a controller;
 one or more logic blocks;
 a dual power supply array comprising a plurality of registers that are to store architectural state;
 a controller local to the dual power supply array;
 a first power supply to be adaptively coupled to the one or more logic blocks and to the dual power supply array; and
 a second power supply to be adaptively coupled to the dual power supply array, wherein the device is to be placed in an energy-efficient low power state in which the one or more logic blocks are to be powered down, and the second power supply is to be coupled to the dual power supply array, and a voltage of the second power supply is to be set to a retention voltage to retain the architectural state stored in the dual power supply array;
 wherein the retention voltage provided by the second power supply is different than a voltage provided by the first power supply during a non-low power state;
 wherein the controller local to the dual power supply array is to reduce a latency associated with entering and exiting from the energy-efficient low-power state by accessing at least part of the architectural state from the dual power supply array instead of from the memory; and
 wherein the local controller is to couple the first and second power supplies to the plurality of registers while the controller sets voltages for the first and second power supplies.

7. The device of claim 6, further comprising:
 a first voltage regulator to provide the first power supply; and
 a second voltage regulator to provide the second power supply.

8. The device of claim 6, further comprising:
 a first power gate to adaptively couple the first power supply to the one or more logic blocks; and
 a second power gate to adaptively couple the first power supply to the dual power supply array.

9. The device of claim 8, further comprising:
 a third power gate to adaptively couple the second power supply to the dual power supply array.

10. The device of claim 6, wherein the controller is to initiate an active power state for the device and to power up the one or more logic blocks.

11. A computer-implemented method, comprising:
 initiating, by a controller, an energy-efficient low power state of a device to reduce power consumption;
 setting, by the controller, a first power supply voltage of a first power supply to be adaptively coupled to one or more logic blocks and to a dual power supply array comprising a local controller and a plurality of registers that are to store architectural state;
 setting, by the controller, a second power supply voltage of a second power supply that is to provide sufficient power to the dual power supply array for retention of the architectural state in the plurality of registers while not maintaining power to the one or more logic blocks, wherein the sufficient power in the low power state is a voltage different than a voltage in a non-low power state;
 coupling the first power supply and the second power supply to the plurality of registers by the local controller;

computing a temperature of the dual power supply array based on receiving input from temperature sensors of the device;
compensating at least one of the first power supply voltage and the second power supply voltage; and
reducing a latency associated with initiating the energy-efficient low-power state by accessing at least part of the architectural state from the dual power supply array instead of from a memory.

12. The computer-implemented method of claim 11, wherein the architectural state is associated with a processing core that is powered down during the low power state.

13. The computer-implemented method of claim 11, further comprising:
computing a predicted operating life of the dual power supply array based on input from aging sensors of the dual power supply array.

14. The computer-implemented method of claim 13, further comprising:
computing aging of the dual power supply array.

15. The computer-implemented method of claim 14, further comprising:
compensating at least one of the first power supply voltage and the second power supply voltage if necessary based on the computed aging.

16. The computer-implemented method of claim 15, further comprising:
computing a required power supply voltage for the dual power supply array.

* * * * *